US005752034A

United States Patent [19]
Srivastava et al.

[11] Patent Number: 5,752,034
[45] Date of Patent: May 12, 1998

[54] APPARATUS AND METHOD FOR PROVIDING AN EVENT DETECTION NOTIFICATION SERVICE VIA AN IN-LINE WRAPPER SENTRY FOR A PROGRAMMING LANGUAGE

[75] Inventors: Aditya Srivastava, Dallas; José A. Blakeley; Stephen J. Ford, both of Plano; Moira Mallison, Dallas; Craig W. Thompson, Plano; David L. Wells, Dallas, all of Tex.

[73] Assignee: Texas Instruments Incorporated, Dallas, Tex.

[21] Appl. No.: 304,980

[22] Filed: Sep. 13, 1994

Related U.S. Application Data

[63] Continuation of Ser. No. 6,061, Jan. 15, 1993, abandoned.
[51] Int. Cl.⁶ .................................................. G06F 19/00
[52] U.S. Cl. .................................................. 395/704
[58] Field of Search .............................. 395/600, 700, 395/682, 704

[56] References Cited

U.S. PATENT DOCUMENTS

| | | | |
|---|---|---|---|
| 4,860,203 | 8/1989 | Corrigan et al. | 364/DIG. 1 |
| 4,894,771 | 1/1990 | Kunii et al. | 364/DIG. 1 |
| 5,067,072 | 11/1991 | Talati et al. | 364/DIG. 1 |
| 5,091,852 | 2/1992 | Tsuchida et al. | 395/600 |
| 5,201,050 | 4/1993 | McKeeman et al. | 395/700 |
| 5,265,254 | 11/1993 | Blasciak et al. | 395/704 |
| 5,305,454 | 4/1994 | Record et al. | 395/682 |
| 5,307,498 | 4/1994 | Eisen et al. | 395/704 |

OTHER PUBLICATIONS

Wells, David, et al., "Architecture of an Open Object–Oriented Database Management System", date unknown, pp. 1–42, Texas Instruments Incorporated, Dallas, Texas 75265, USA.

Object Management Group, "Object Services Architecture", Rev. 6.0, OBG Doc. 92.8.4, 28 Aug. 1992, pp 1–72, Framingham Corporate Center, Framingham, MA 01701–4568, USA.

Wells, David, "DARPA Open Object–Oriented Database Preliminary Module Specification", Meta–Architecture Support, Version 2, Nov. 24, 1991, Texas Instruments Incorporated, Dallas, Texas, 75265, USA, pp. 1–57.

Peterson, Robert W., "DARPA Open Object–Oriented Database Preliminary Module Specification", Version 2, 30 Aug. 1991, pp. 1–8, Texas Instruments Incorporated, Dallas, Texas 75265, USA.

Ford, Steve, "DARPA Open Object–Oriented Database Preliminary Module Specification", Version 1, Aug. 31, 1991, pp. 1–10, Texas Instruments Incorporated, Dallas, Texas 75265, USA.

Primary Examiner—Thomas M. Heckler
Attorney, Agent, or Firm—W. Daniel Swayze, Jr.; W. James Brady, Jr.; Richard L. Donaldson

[57] ABSTRACT

The present invention provides an in-line wrapper sentry for a programming language to detect events and to transparently extend the behavior of the events.

34 Claims, 3 Drawing Sheets

APPARATUS AND METHOD FOR PROVIDING AN EVENT DETECTION NOTIFICATION SERVICE VIA AN IN-LINE WRAPPER SENTRY FOR A PROGRAMMING LANGUAGE

This application is a Continuation of application Ser. No. 08/006,061, filed Jan. 15, 1993, abandoned.

This invention was made with Government support under Contract No. DAAB07-90-C-B9 20 awarded by the Defense Advanced Projects Research Agency (DARPA) and administered by U.S. Army CECOM. The Government has certain rights in this invention.

The present application incorporates by reference herein the following pending U.S. applications: Serial No. 07/516, 369, filed Apr. 30, 1990, entitled "Apparatus and Method for Adding an Associative Query Capability to a Programming Language"; Serial No. 07/526,215, filed May 21, 1990, entitled "An Apparatus and Method for Providing a Facility for Managing Versions and Configurations of Persistent and Transient Objects", abandoned; and Serial No. 07/531,493, filed May 30, 1990, entitled "A System and Method for Database Management Supporting Object-Oriented Programming", now U.S. Pat. No. 5,297,279.

Technical Field of the Invention

This invention relates to object-oriented programming languages and object-oriented database management systems and more specifically to a method and apparatus for in-line wrapper sentry to be used to detect events and to transparently extend the behavior of events.

BACKGROUND OF THE INVENTION

As illustrated in FIG. 1, a computer includes a CPU compiler (100) to control the computer, memory (120) to store information secondary storage (130) to store additional information, input devices (110) to input information, and output devices (140) to output information. The CPU (100) may include as illustrated in FIG. 2 a data management system (215). The database management system (215) includes a number of functional components including a file manager (212), which manages the allocation of space on disk storage and the data structures used to represent information stored on disk (210), a database manager (214) to provide the interface between the low-level data stored in the database and the applications programs and queries submitted to the system, a query processor (220), which translates statements in query language into low-level instructions that the database manager understands, and attempts to transform a user's request into an equivalent but more efficient form, thus finding a good strategy for executing the query, a data manipulation language pre-compiler (218), which converts Data Manipulation Language (DML) statements embodied in an application program to normal procedural calls in the host language and interacts with the query processor in order to generate the appropriate code, and the Data Definition Language (DDL) compiler to convert the Data Definition Language to a set of tables containing metadata.

One such database is the Texas Instruments' Open Object-Oriented DataBase (Open OODB), which employs the Open OODB computational model, allowing developers to define behavioral extensions of events, which is an application of an operation to a particular set of objects.

It is desirable that the database be open such that developers or researchers can control, modify or extend some part(s) of its architecture or implementation. The Open OODB Meta architecture provides procedures to declare the events to be extended to a sentry manager, to detect events with sentries and to transparently extend the behavior of events by policy managers. This general architecture is described in Wells, Blakeley, Thompson, "Architecture of an Open OODB", IEEE Computer, Oct., 1992, p. 74.

While it is desirable to design a database so that no extensions or additions are ever required, the programmer is often faced with the need to modify the database to change existing data or add additional data in order to provide for functions that have not been heretofore envisioned. One method of conceptually envisioning behavioral extensions to objects is providing a new class which inherits from a base class for handling a specific extension or set of extensions. However, this method is not preferred and it is difficult to implement such behavioral extensions in a language such as C++. This approach generally causes the program to generate multiple inheritances even though a single inheritance had been previously used. Thus, C++ programs that execute properly under single inheritance, often provide erroneous results using multiple inheritance.

Objects are included in a "universe of objects" which are partitioned into "environments" by "environmental attributes". These environments and boundaries of the environments identify where extensions may be required. For example, an address space in which an object resides is an environmental attribute.

FIG. 3 illustrates the design space for sentry managers and illustrates the various functions of sentry managers. The sentry manager is the locus for specifying events to be extended, and, as part of the task of the sentry manager, the sentry manager is responsible for deploying sentries to detect extended events. A common interface must exist between the user's program and this policy manager by which sentries call on policy managers. This common interface passes sufficient information so that the policy manager can decide if an extension is necessary and then perform the extension. The policy manager additionally executes the event if in accordance with the policy of the policy manager. This information must be obtained by the sentry. A goal of the sentry is to maintain the seamlessness of the database. This seamlessness generally requires language that is specific with respect to the sentry. Thus, new behaviors or capabilities can be added without the programmer being aware of the new behavior.

With sentries, speed and power are usually conflicting properties. Powerful sentries are generally slower than less powerful sentries. As a database matures, the less powerful but faster sentries are generally desirable while with a new database, powerful sentries are needed. In order to change sentries to meet the needs of the database, a large amount of pre-programming effort must be expended. It is desirable to have a fast yet powerful sentry and a sentry which can be easily changed.

FIG. 4 illustrates the design space for sentries and illustrates the functions of sentries. The primary function of sentries is to detect events and to pass control to a policy manager which controls and performs the actual extension if it is determined that an event should be extended. Sentry mechanisms differ in coverage, performance, selectivity and dynamism of deployment and removal.

One of the functions of computer software programs is to manipulate data by the use of programming language instructions. Typically, the data requirements of the computer software program change over the period of time that the computer software program is used. If the data manipulated by the computer software program was not shared by other computer software programs, changes in the data configuration would present little or no problems. However, generally the data is shared between different computer programs, and it is essential that the data and data format be compatible between the different computer programs. If output data produced by one version of the computer program is retained to be reused by other computer programs, the data output by subsequent versions of the same computer program must be at least compatible with the original output data. This is a significant problem since subsequent versions of the program may require either different schematics or formats for the output data. Thus, both the problems of multiple program instances of the data and the use of old data by subsequent versions of the same computer program are problems of configuration management and schema evolution.

Manually changing the software code to include these changing data requirements is both costly and error prone. It is estimated that between 70–90% of all software budgets are spent maintaining existing code of these computer programs. While a portion of the software budgets are used to fix errors within the computer programs, a substantial portion of the software budget is spent on implementing changes to the computer program so that these programs are able to access the data which has been changed. Thus, any automation which solves the problem of evolving software has the potential for enormous savings.

A prerequisite to making these program changes involves the detection of the instances when the database is accessed. The mechanism for interrupting operation so that some additional activity can occur are widely available in computer hardware and software. Generally, such interruptions or traps are used for very specific, limited purposes. Thus, the trapping mechanism combined with the protocol for permitting the entity performing the trapping to invoke an arbitrary extension is known as a "sentry". The protocol, for example, the policy manager, for communicating with the behavior modifier, has been known. However, variability with respect to the interruption of the operation exists only in the trapping aspect of the sentry mechanism.

One such trapping mechanism is hardware interrupts. Many computers include hardware interruption mechanisms that can be used to interrupt the flow of machine instruction execution between existing machine instructions. Such hardware interrupts typically correspond to the arrival of data at an input port or a machine register reaching a predetermined value. Thus, these hardware interrupts are extremely machine-specific and would be useful for only a small percentage of possible events. Furthermore, these hardware interrupts are defined only at very specific levels of abstraction, for example, machine level instructions, and are not defined for higher level programs which need to be extended, such as C++.

Another mechanism for interrupting some form of operation is bad data traps. Many hardware platforms or software run-time systems define certain data values or type tags as "invalid" to be encountered under particular circumstances. If one of these invalid data types or type tags are encountered, an exception occurs which can be trapped. Texas Instruments implemented such a bad data trap sentry based on employing bad data tags on the Texas Instruments' Explorer LISP machine. One large disadvantage of this type of sentry is that it is platform-specific. That is, the trap can only be activated during memory access. The trap cannot be activated during a function dispatch. Furthermore, this type of sentry tends to interfere with other system primitives that are, in fact, permitted to use these values which have been designated as "illegal". This sentry trap appears to be inherently unstable in that the interaction between system primitives are very subtle and correspondingly vary unpredictably if the other primitives are modified. Additionally, the changes in the system primitives could be overlooked since operating system developers generally presume that only other operating system developers program at such a low level, and, as a consequence, the operating system developers are not required to maintain consistency of these features between releases.

Another type of mechanism for interrupting operation is virtual memory traps. Most modern computers employ the concept of "virtual memory", which permits programs to address memory which is outside of the physical memory available. When the program attempts to access the data item not actually in physical memory, a trap occurs, and the memory page containing the data item not in memory is brought into real memory. Traps of this type which have been modified have been used with limited success in some OODBs to permit objects that have not been retrieved from object store the database to be transparently retrieved. This particular technique has at least three significant drawbacks. First, the modifications to the normal virtual memory mechanism are hardware-specific and operating system-specific to make the modifications applicable to database applications. As a consequence, such a technique would be inappropriate for programming languages such as C++. Second, only when a data item is touched can the data item be trapped. Thus, it is not possible to trap the execution of a particular function or method associated with an object. This limitation precludes application of this mechanism for several kinds of extensions, for example, index maintenance. Lastly, since this type of trapping is based on memory addresses, it is not clear how programs which are compiled with one presumption with respect to the physical layout of the data could correctly function with the data created by a second program having a different presumption with respect to the physical layout of the data. This is a significant drawback since modifications to the program itself to add new features frequently change the physical layout. As a consequence, schema evolution becomes significantly more difficult by employing this type of trapping mechanism.

A further type of interruption mechanism is delegation. Delegation is an object-oriented technique where class instances are permitted to ask a "delegate" object how to perform operations that they themselves do not know how to perform. Delegation has not been employed in C++.

A further mechanism for interrupting some operation is a before-method, after-method and around-method. Certain programming language, such as LISP and the extension of LISP, the Common LISP Object System (CLOS), provide language mechanisms to dynamically modify the behavior of certain functions associated with particular classes of objects. These mechanisms do not exist is languages such as C++.

A further mechanism for interruption is changes to function dispatch mechanisms. The CLOS has language features collectively known as the "Meta Object Protocol" that allows for the redefinition of how functions are to be dispatched, for example, prepared for execution and then executed. The Meta Object Protocol can be used to modify dispatch so that any declared extensions are executed as called for by the Open OODB Meta architecture. This technique is not available for C++ programs, and applies only to member functions of classes, making it unable to cover direct slot accesses of the object state.

Another mechanism for interrupting some operation is virtual function modification. With normal C++ language, there is a single, immutable "virtual function dispatch table" for each object class. The researchers at the University of Utah have prototyped a mechanism to allow each instance of a class to have a distinct virtual function dispatch table. Each of these tables can be independently populated with modified virtual functions that extend or change behavior. This type of mechanism cannot be used to trap a memory access, precluding this type of mechanism's use to ensure the residency of an object which is using a virtual function. An additional problem is that if a wide variety of tables are managed, the application's code size increases dramatically.

An additional mechanism for interrupting some type of operation is a "surrogate object". This surrogate object represents in some manner another object which may or may not be present in physical memory. The surrogate object intercepts all messages directed at the actual object and in fact performs any necessary actions before forwarding the messages to the actual object for execution. Additionally, the surrogate object may cause the actual object to be instantiated, for example, by retrieving the actual object from a database. The disadvantage of surrogate objects with respect to C++, is that the state of the actual object can be manipulated by the C++ program without the member functions of the class of the object being monitored. As a consequence, the object can be affected without activating the sentry, resulting in a semantic error that would cause the behavioral extension to be omitted.

SUMMARY OF THE INVENTION

In view of the above problems associated with the related art, it is an object of the present invention to provide an apparatus and method employing an in-line wrapper sentry for languages such as the C++ programming language.

Another object of the present invention is to provide an apparatus and method extending either the operation of the program or the data manipulated by the program to existing C++ object type/classes, for example, persistence, versioning, indexing, replication and security.

It is another object of the present invention such that these features be automatically embedded by a language preprocessor which does not require modifications to the language compiler.

It is another object of the present invention to reduce the cost and increase the accuracy of modifying existing or new computer programs to add behavioral extensions.

Another object of the invention is to reduce maintenance costs and information loss.

And lastly, an object of the invention is to transparently extend the behavior of normal operations (events).

The present invention transparently extends the behavior of normal operations or events without requiring language computer modifications. The present invention reduces cost and information loss by providing the in-line wrapper sentry for languages such as C++.

These and other features of the invention that will be apparent to those skilled in the art from the following detailed description of the invention, taken together with the accompanying drawings in which:

DESCRIPTION OF THE DRAWINGS

FIG. 9 is a block diagram illustrating the operation of the preprocessor.

DETAILED DESCRIPTION OF THE INVENTION

The present invention treats all extendable classes as "logically" inheriting from a "conceptual" base class of "extendable-objects". This conceptual base class defines the necessary structures and functions to make all classes inheriting from this conceptual base class include a "sentry". Unlike the case of normal inheritance, the class of "extendable-objects" is never seen or actually compiled by the C++ compiler. Instead, all of the classes logically inheriting from the class of "extendable-objects" are modified by a language preprocessor to insert the defined structures and functionality into each actual class. These classes modified by the preprocessor, are then compiled by the C++ compiler. Thus, by generating the sentry code before the time the C++compiler compiles the program, the artificial multiple inheritance created by the C++ compiler as described above does not occur, and to replace the C++compiler is not required. A normal C++ compiler will ensure that pointer conversion, base class offsets, friend functions, etc., operate properly. These functions operate properly because a normal C++ compiler is employed.

Figure 1:
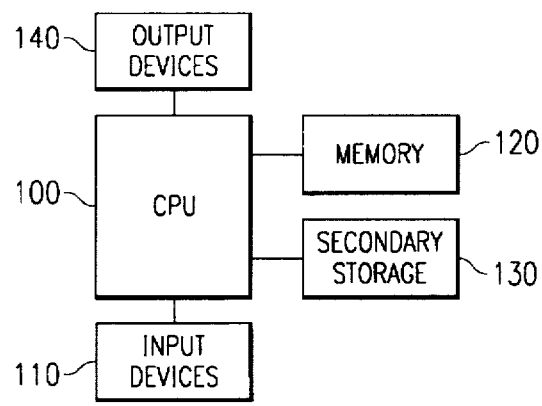
FIG. 1 is a block drawing diagram of a computer.
Figure 2:
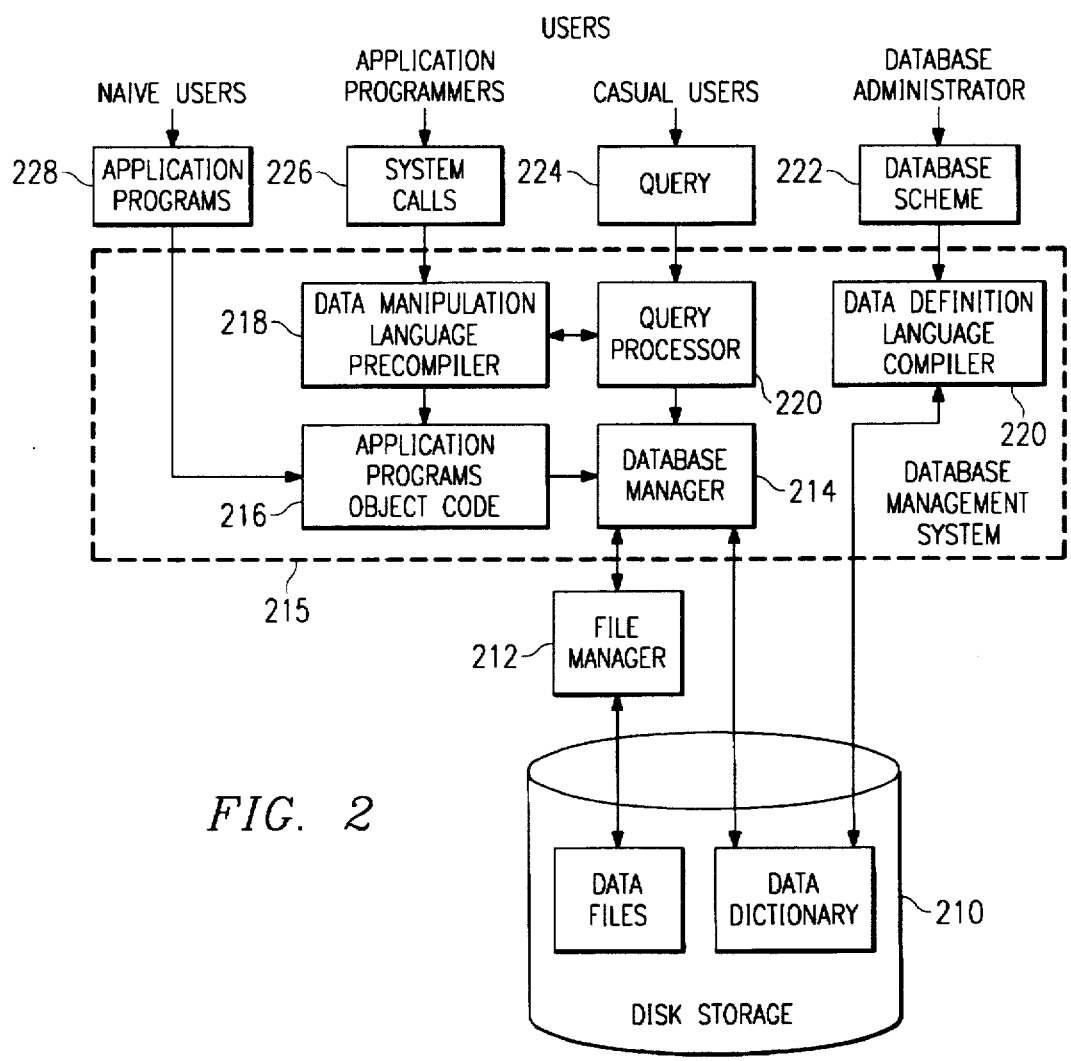
FIG. 2 is a block diagram of a data management system and associated disk storage.
Figure 3:
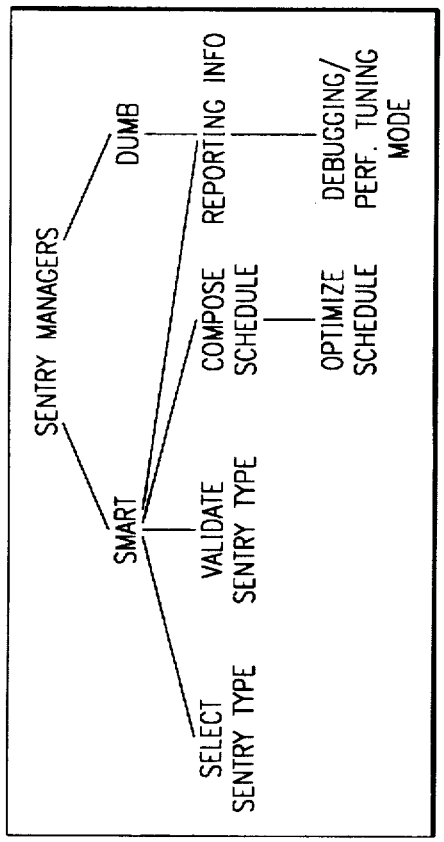
FIG. 3 is a diagram illustrating the various functions of sentry managers.
Figure 4:
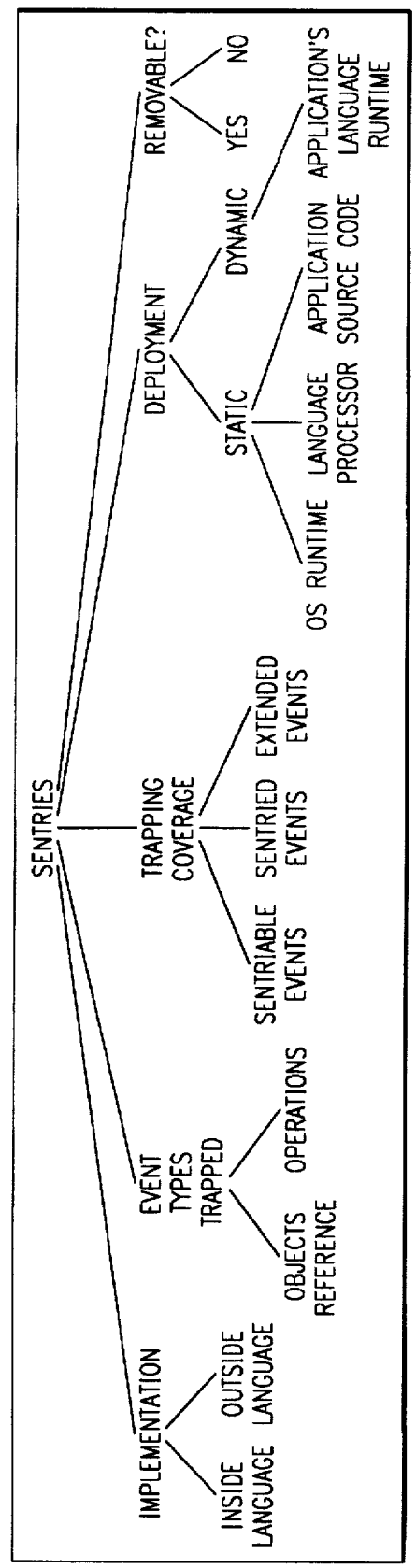
FIG. 4 is an illustration of the function of sentries.
Figure 7:
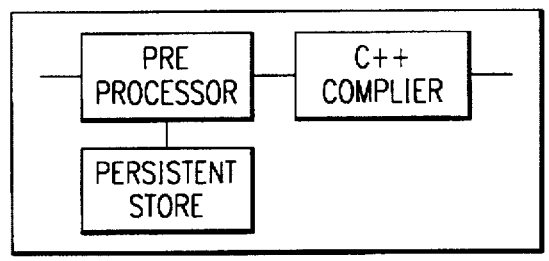
FIG. 7 is a block diagram of the compiler and preprocessor.
Figure 5:
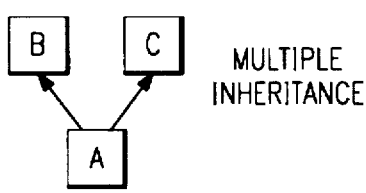
FIG. 5 is an illustration of a multiple inheritance database.
Figure 6:
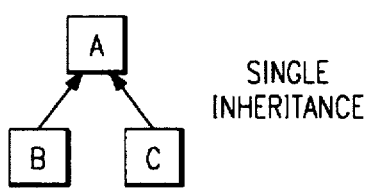
FIG. 6 is an illustration of a single inheritance database.

As illustrated in FIG. 7, the preprocessor accepts as input the code program requiring the extendable-objects to be added; the pre-preprocessor processes the input program and outputs an equivalent program with the extensions including sentries added. The outputted equivalent program, when linked with policy performer modules, performs all the added behavioral extension to an object when the equivalent program is executed. The preprocessor as illustrated in FIG. 7 would be positioned upstream of the compiler for execution by the database manager (214). The preprocessor adds the behavioral extensions to an object in 2 steps:

(i) the preprocessor preprocesses the input program and obtains information with respect to the input program;

(ii) the preprocessor then generates an equivalent program from the information and the preprocessed program is outputted with the extended classes.

As the preprocessor processes and collects information with respect to the input program, the preprocessor uses a generic C++ processor that processes and collects all C++ declarations, in particular, the class/struct declarations. With respect to the class, the preprocessor collects, in particular, the members, constructor/destructor, copy constructor and assignment operator, inheritance hierarchy - base class information, friend functions/classes, function properties such as virtual, non-virtual and static, and accessibility of state variables, for example, public, private, or protected.

In addition to the above function, the preprocessor generates and then outputs the equivalent program with the extended classes. This is accomplished by extending every member function of a class with a sentry that traps certain events, triggers an action to successfully complete the action corresponding to the event, and resumes normal execution. A typical sentry code is illustrated in Example 1.

EXAMPLE 1:

```
1:  if (event_set()) {
2:     save_arguments();
3:     void *adjusted_ptr = adjust_to_most_derived_object();
4:     do_action(adjusted_ptr,address of function to execute);
    }
```

As illustrated, line 1 determines if an event is set on this object. If the event is set, the formal parameters of the function are saved in special locations as specified by line 2. Line 3 adjusts the object value to point to the most-derived (the highest or root derived object in the inheritance lattice) object. Line 4 performs the action associated with the event and passes the function to the event to call when executed. The address of the function corresponds to the actual function that the programmer intended, but has been modified and renamed by the preprocessor.

Example 2, which follows, illustrates the extension of all non-static member functions by sentry code, except constructors/destructor.

EXAMPLE 2:

```
1:  classA {
2:     int a;
3:
4:  public:
5:     int get_a() {return(a);}
6:  };
is extended to
7:  classA {
8:     int a;
9:  public:
10:    ORIGINAL_get_a() {result = a;return(result);}
11:    static get_a_static_oodb_fn_(void *ptr) {
12:       return(((A *)ptr->ORIGINAL_get_a());
13     }
14:    int get_a() {
15:       if (Events_Placed(A::get_a)
16:          void *real_this = this->adjust_to_most_derived_object();
17:          // no arguments - omit save_arguments();
18:          do_action(real_this,&get_a_static_oodb_fn_);
19:          return(result);
20:       }
21:       else return(ORIGINAL_get_a());
22:    }
23: };
24:       do_action(real_this,&get_a_static_oodb_fn_);
```

As illustrated by Example 2, lines 1–6, correspond to the user's original class code for example a predetermined code. Lines 7–23 illustrate the output of the generated class that has been extended to trap different kinds of events for example directly after the predetermined code. Note, each member function such as the member function on line 5 ("get_a") is modified and renamed to "ORIGINAL_get_a" as in line 10. An additional "get_a" function as illustrated on lines 14–22 is generated, containing the trap-event code as illustrated in lines 15–20. The code of the generated static function is illustrated in lines 11–13 and these lines will be invoked by the policy manager of events which are trappable for this object. Line 13 invokes the "ORIGINAL_get_a" if the object of a type class A. Note, that in this case, the argument "void *ptr" will be of type class A.

Line 15 determines if this object includes any events to trap. If the object has events to trap, then lines 16–19 are executed. Line 16 adjusts the pointer address of the object to point to the most-derived object. Line 17 saves the values of the argument passed to the function "get_a" in storage. In this specific case, since the function "get_a" includes no arguments are saved. Line 21 transfers control to the routine that invokes the appropriate action routines, such as event-handlers, for this event; these are typically the policy managers of the event. The address of the "get_a_static_oodb_fn_" is passed as an argument in line 18. This function will be invoked after control is returned from the event-handling routines. Instruction 24 illustrates that the behavioral operation is executed before the original operation. The behavioral operation could be executed after the original operation.

The sentry code is complex due to the fact that any arbitrary behavior can be added to class A. As illustrated by Example 3, which follows, if only persistence behavior is added to the class, the code is simpler than the above example.

EXAMPLE 3: Only persistence behavior being added to the class A.

```
1:  class A {
2:     int a;
3:  public:
4:     int get_a() {return(a);}
5:  };
is extended to
6:  class A {
7:     int a;
8:  public:
9:     inline int get_a_oodb_fn_() {
10:       return(a);
11:    }
12:    int get_a() {
13:       if (Is_Persistent()) {
14:          void *real_this = this->adjust_to_most_derived_object();
15:          Trap_Fault(real_this);
16:       }
17:       return(get_a_oodb_fn_());
18:    }
19: };
```

As illustrated in the above example, for each user-defined member function, for example, "get_a" as illustrated in line 4, an in-line member function is automatically generated; for example, "get_a_oodb_fn_" as illustrated in line 9 is automatically generated. For example lines 1–5 corresponds to the predetermine code and lines 6–19 are positioned directly after the predetermined code.

Note, the user function name, for example, "get_a" is changed to, for example, "get_a_oodb_fn_". Additionally, a new "get_a" is generated, for example, in lines 12–18, and the sentry code, for example, in lines 13–16, is positioned before the call of the actual code of "get_a_oodb_fn_" as in line 17. The instruction on line 13 determines if the object is persistent and requires to be fetched from the persistent store such that the object is stored in an external memory such as a disk. The instruction on line 14 modifies the object address to point to the most-derived object. The instruction on line 15 performs the object fault and fetches the most-derived object from the persistent store. Lastly, the instruction on line 17 resumes execution by a call to "get_a_oodb_fn_".

Figure 8:
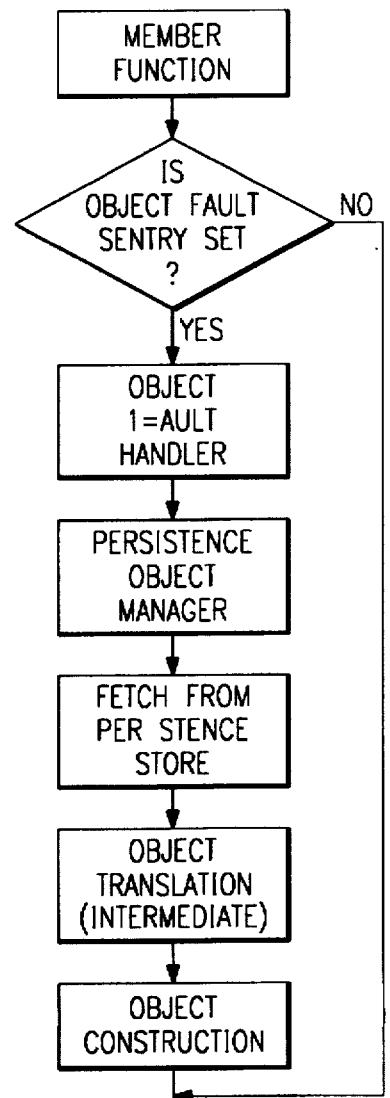
FIG. 8 is a block diagram illustrating the sentry being involved with a "pre-allocation" strategy.

As illustrated in FIG. 8, the Trap_Fault of instruction line 15 uses a "pre-allocation" strategy when fetching objects from the persistent store. Thus, only the initial part of the object is fetched and the remaining portions of the object's closure is postponed until it is absolutely necessary that these other remaining portions be brought into main memory. This "pre-allocation" strategy allocates empty space for the object, but does not immediately fill in the values for the object residing in the persistent store.

Thus, when this allocated but unused space is in fact accessed, the sentry "object fault" extension fetches the object state from the persistent store and fills in the necessary values.

As illustrated in FIG. 8, the member function determines if the object fault sentry is present. If the object fault sentry is not present, normal execution continues. However, if the object fault sentry is present, the object fault handler is invoked; the persistent object managing routine is invoked which fetches the remaining object from the persistent store, then object translation of the object is performed; and finally object construction of the object is performed before returning control to normal execution.

This "pre-allocation" strategy has several advantages. First, not all the objects from the persistent store are required to be fetched. This demand-driven manner or on-use manner saves memory space since the in-memory space is only used as required. Additionally, this "pre-allocation" strategy saves time since time is not wasted accessing the portion of the object from the persistent store. Additionally, the "pre-allocation" strategy of the present invention saves time, since the time that would be required to fill in the values is saved.

The preprocessor additionally generates a "copy constructor" and/or "assignment operator" in accordance with a predetermined indicator which is set by the user. The copy constructor functions when an argument of type "class" is included as an argument, and the assignment operator is used when one object is assigned to another object. The language such as C++ could automatically generate these functions, if not explicitly defined by the user with the default semantics of memberwise copying. If the classes do not define either or both of the "copy constructor" and the "assignment operator", the preprocessor generates these two functions with corresponding sentry-code inserted. The function of the "copy constructor" and the "assignment operator" traps certain events as well as exhibits the behavior of the default copy constructor and the default assignment operator as defined by the language.

These copy constructor and assignment operators are generated seamlessly and uniformly without programmer intervention and without affecting the default semantics of the copy constructor function and the assignment operator function as defined by the language.

Example 4, which follows, is an example of an automatically generated copy constructor and assignment operator.

EXAMPLE 4:

```
1:  class A {
    ...
2:  A(const A &arg) {
3:    if (Is_persistent(&arg)) {
4:      void *real_this = this->MostDerivedObject();
5:      TrapFault(real_this);
6:    }
7:    char *this_ptr = (char *)this, arg_ptr = (char *)&arg;
8:    for (i = 0; i < sizeof(*this); ++i)
9:      *this_ptr++ = *arg_ptr++;
10: };
11: A &operator=(const A &arg) {
12:   if (Is_Persistent(&arg)) {
13:     void *real_this = this->MostDerivedObject();
14:     TrapFault(real_this);
15:   }
16:   char *this_ptr = (char *)this, arg_ptr = (char *)&arg;
17:   for (i = 0; i < sizeof(*this); ++i)
18:     *this_ptr++ = *arg_ptr++;
19:   return(*this);
20: };
    ...
21: };
```

As illustrated in Example 4, the instructions of lines 1–21 are a definition of a class that has defined neither a copy constructor nor an operator instructor. The instructions for the copy constructor generated with an appropriate sentry code for persistent behavior extension only, is illustrated in the above lines 2–10. The instructions for assignment operator generated with the appropriate sentry code for the "operator=" are illustrated in lines 11–20. The instructions on lines 3 and 12 check whether the object is persistent and correspondingly needs to be fetched from the persistent store; the instructions on line 4 (and 12) is executed to adjust the address pointed to by "arg" to point to the most derived object, for example, the most derived object faulted as compared to a portion of the most derived (sub-class). The instructions on line 5 (and 13) forms a fault on the object to fetch the object from the persistent store. The instructions on lines 7–9 and 16–18 performs memberwise copying of the object as required by the C++ default copy constructor and assignment operator semantics.

Additionally, all classes are extended to inherit from a common "virtual" base class for fast and efficient checking of events placed on an object. While this is not a requirement in our invention, it is an alternative for implementing checking of events efficiently. There is at least one copy of this special base class in any inheritance hierarchy, and this base class contains a bit map of event information to indicate whether any event or extensions have been added to this object and which event or extensions have been added. Normally, when no behavioral extensions have been added to an object, this common "virtual" base class results in a minimal-run time performance penalty. A bit in the bitflag is used to indicate whether an object is marked for other common extensions, such as persistence. Additionally, less common behavioral extensions can be indicated through a more expensive out-of-line routine.

As indicated in Example 5, the common "virtual" base class information is extended from user instruction of line 1.

EXAMPLE 5:

```
1:  class A {...};
    is extended to
2:  class A : public virtual_Wrapper_State {...}
3:  class_Wrapper_State {
4:    unsigned int any_event:1;
5:    unsigned int persistent:1;
6:    unsigned int version:1;
7:    unsigned int event1:1;
      ...
      ...
    };
```

As can be seen from the above example, the instruction on line 2 illustrates extending the class definition as illustrated in line 1 to inherit "virtually" from a "_Wrapper_State".

The instruction on line 4 defines a member. "any_event", and if the member is set, that specifies that an extension is added to this object. The instruction of line 5 illustrates that another is member "persistent", and if set, specifies that an object is extended to be persistent. In a similar fashion, the instruction of lines 6–7 defines members that specify if a particular extension, for example, "versioning" is added to an object of this class.

FIG. 9 illustrates the operation of the preprocessor. Possible code modifications by the user are added to an application C++ source code to obtain a modified application C++ source code. The preprocessor preprocesses the modified application C++ source code to parse the C++ code and insert sentries into the C++ code. The sentried application C++ code is transferred to a conventional C++ compiler. From this, sentried application object code is developed and subjected to a conventional linker to result in sentried executable application code.

While the above-mentioned technique was illustrated by use of the OODB, the invention can be equally used in the backplane of an object service architecture, such as that developed by the Object Management Group (OMG).

The use of the in-line wrapper sentry technique was illustrated with the C++ programming language operations and objects to support varying database capabilities. However, the technique could be equally applied to C++ programs containing no database, for example, by adding transient versions, monitoring or simulations. The technique additionally could be used with C++ programs involving distributed data and sharing across computer networks. Additionally, the technique could be used by adding a general delegation capacity to C++programs.

Despite the fact that the in-line wrapper has been explained with respect to the C++ language, the in-line wrapper technique could equally apply to other programming languages in which objects have interface functions to be extended and can be accessed without using interface functions.

Tables 1 and 2 illustrate the output of the preprocessor for a program which has been extended to support the "persistent" behavior. Tables 3–10 illustrate the implementation of the preprocessor module which generates the in-line wrapper.

Other Embodiments

In addition to C++, other languages could be used, such as Ada, Pascal, Algol, and Cobol. These languages are extended with object-oriented capabilities, which include encapsulation, method or inheritance.

Although the present invention has been illustrated by use of a program language preprocessor, the present invention could be installed by a compiler.

Additionally, whether or not the compiler or preprocessor is employed, a file could be maintained. The members of the file corresponds to the different classes and would indicate whether or not these particular classes are to be sentried or not sentried. Additionally, the class constructs that are associated with a sentry manager could be a C++ language annotation, for example, a key word like "sentry" that corresponds to the class, appearing with the class definition in the programming source code.

Additionally, the new behavioral class extensions could be added to the central manager or existing behavioral extensions could be removed at run-time, for example, occurring during the lifetime of an executing computer program. Additionally, after the sentry detects the event, a collection of behavioral extensions to the event could be executed.

Additionally, if the class contains "public state" wherein the access to the class is unrestricted, the storage area to accommodate an instance of the class is pre-allocated. However, the class is still extended with persistent behavior. Furthermore, if the behavior is persistent, distribution or any materialization operation then the objects can be fetched on demand. Lastly, examples of the extended behavior include versioning, persistence, replication management, security access control, encryption/decryption, maintaining indices, object-type access, distribution, performance monitoring or maintaining dependency nets.

Although the present invention and its advantages have been described in detail, it should be understood that various changes, substitutions and alterations can be made herein without departing from the spirit and scope of the invention as defined by the appended claims.

TABLE 1

```
/* ***************************************** */
/*              Original class definition        */
/* ***************************************** */
class OBJECT {
private:
    int i;
    OBJECT *self;
public:
    Object_i( ) { return ( i ) ; } ;
    OBJECT *Object_self( ) { return ( self ) ; } ;
    OBJECT( ) { i = ++I ; self = this ; } ;

/* ***************************************** */
/* EXTENDED class definition for Persistence Behavior */
/* and object TRANSLATION                     */
/* ***************************************** */
class OBJECT : public virtual_Wrapper {
    int i;
    class OBJECT *self ;
public:
    ORIGINAL_Object_i( )
        { return ( i ) ; } ;
    Object_i( ) {
```

TABLE 1-continued

```
                if (__Wrapper__Trap_Flag( ) == 1) {
                    int sz;char *classname;void (*fn1)(voil *),(*fn2)(void *,int);
                    OpenOODB->TrapFault(((OBJECT *)this)->oodb__GetRealObj(sz,classname,fn1,
fn2));
                    __Wrapper__Set__Trap_Flag(0);
                }
            return(ORIGINAL__Object__i( )};
        };
    class OBJECT *ORIGINAL__Object__self( )
                    { return ( self ) ; } ;
    class OBJECT *Object__self( ) {
            if (__Wrapper__Trap_Flag( ) == 1) {
                int sz;char *classname;void (*fn1)(void *), (*fn2)(void *, int);
                OpenOODB->TrapFault(((OBJECT *)this)->oodb__GetRealObj(sz,classname,fn1,
fn2));
                __Wrapper__Set__Trap_Flag(0);
            }
        return(ORIGINAL__Object__self( )};
        };
    OBJECT( )
        { i = ++ I ; self = this ; } ;
    class OBJECT &operator=(const class OBJECT &arg) {
            if (arg.__Wrapper__Trap_Flag( ) == 1) {
                int sz;char *classname;
                void (*fn1)(void *),(*fn2)(void *,int);
                OpenOODB->TrapFault(((OBJECT &)arg).oodb__GetRealObj(sz,classname,fn1,
fn2));
                ((OBJECT &)arg).__Wrapper__Set__Trap_Flag(0);
            }
        {int i;char *ptr = (char *)this,*ptr1 = (char *)&arg;
```

TABLE 2

```
                for (i = 0; 1 < sizeof(*this); ++i) *ptx++ = *ptx1++;}
                return(this);
            };
    OBJECT(const class OBJECT &arg) {
            if (arg.__Wrapper__Trap_Flag( ) == 1) {
                int sz;char *classname;void (*fn1)(void *),(*fn2)(void *,int);
                OpenOODB-> TrapFault(((OBJECT &)arg).oodb__GetRealObj(sz,classname,fn1,fn2))
;
                ((OBJECT &)arg).__Wrapper__Set__Trap_Flag(0);}
            (int i;char *ptr = (char *)this,*ptr1 = (char *)&arg;
            for (i = 0; i < siefof(*this); ++i) *ptr++ = *ptr1++;}
            };
    OBJECT(classrXorOoDb *) { } ;
    OBJECT(class XorOoDb *) { oodb__copy__self( ); } ;
    in oodb__copy__self( ) {
        if (!(self))
            xor__pointer(((void *)(this->self)),((void *)(&this->self)),sizeof(int),0);
        else (self)->persist((char *)0,1,self,&this->self,0);
        return(0),
        };
    static void oodb__staticReCopySelf(void *ptr,int flag) {
        new ((OBJECT *)ptr) OBJECT((class rXorOoDb *)0);
        ((OBJECT *)ptr)->__Wrapper__Set__Trap_Flag(flag);
        };
    static void oodb__staticCopySelf(void *ptr) {
        new ((OBJECT *)ptr) OBJECT((class XorOoDb *)0);
        };
private:
    virtual void *oodb__GetRealObj(int &sz,char *&classname,
                    void (*&fn1)(void *),
                    void (*&fn2)(void *,int )) {
        sz = sizeof(*this);classname = "OBJECT ./object.h";
        fn1 = oodb__staticCopySelf;fn2 = oodb__staticReCopySelf;
        return((void *)this);
        };
public:
    void persist(const char *db__key=0,int flag=0, void *original__ptr=0,
                    void *pointer__pos=0,int cnt=0) {
        int sz; char *classname; void (*fn1)(void *);(*fn2)(void *,int));
        void *real__obj = ((OBJECT *)this)->oodb__GetRealObj(sz,classname,fn1,fn2);
        int rel__pos = (char *)this - (char *)real__obj;
        if (!flag)
            MakeObjectPersistent(db__key,classname,real__obj,sz,rel__pos,fn1,fn2);
```

TABLE 2-continued

```
    else xor_pointer_class(classname,original_ptr,real_obj,pointer_pos,sz,rel_pos
,fn1,fn2,cnt);} ;
};
```

TABLE 3

```
#include <stdio.h>
#include <string.h>
#include "opnames.h"
#include "tokcodes.h"
#include "ccpp.h"
#include "symdecl.h"
#include "oodb_names.h"
extern FILE *cout,*cerr;
extern char *string_save( );
extern NAME "GenSym_Id( ),*GenSym_FuncName( );
extern SYMDECL *new_yacc_tmp( );
extern TAGDECL *Tags[ ];
extern int TagsTop;
extern SYMDECL *Xlast_Member_Added;
#define OODB_TRAP_ON ** /* "OODB_trap_on_(this);" */
#define OODB_FUNC_DECL ** /* "extern void *OODB_trap_on_(void *);" */
/*
#define DO_NOT_WRAP_TAG(ty) \
        !(ty == D_CLASS_TAG || ty == D_STRUCT_TAG)
*/
#define DO_NOT_WRAP(member) \
        (!ISFTN(member) || \
        IS_FRIEND(member) || IS_PURE_VIRTUAL(member) || \
        IS_STATIC(member) || \
        fnCTOR(member) || fnDTOR(member))
#define IS_WRAPPABLE(member) \
        (!(IS_STATIC(member) || fnCTOR(member) || fnDTOR(member)))
#define OPERATOR_EQ(mem) (fnOPER(mem) && strcmp(VARNAME(mem),OP_EQ) == 0)
NAME *Wrapper_Baseclass_Namep = NULL;
SYMDECL *find_member( );
NAME *change_fn_name(name)
char *name;
{
    char buf[1028];
    sprintf(buf,"%s%s",name,"_OOdbFn_");
    return(GenSym_Id(buf));
}
NAME *change_conv_fn_name(func)
SYMDECL *func;
{
    static int count = 0;
    char buf[256];
    int i;
    i = SYMDECL_CONV_COUNT(func);
    if (i == 0) {
i = ++count;
```

TABLE 4

```
        SYMDECL_CONV_COUNT(func) = i;
    }
    sprintf(buf,"operator_conv_%d_",i);
    return(GenSym_Id(buf));
}
NAME *change_operator_fn_name(name)
char *name;
{
    NAME *np;
    char *new_name;
    int i,l,len,c;
    char buf[128],buf1[128];
    if (substring(name, "operator") == 0)
        dprintf("error: change_operator_fn_name\n");
    for (i = 0,l = 8; *(name + 1) != '\0'; ++i, ++;) |
        c = *(name+1);
        switch(c) {
        case '+': *(buf+i) = 'P';break;
```

TABLE 4-continued

```
        case '-': *(buf+i) = 'M';break;
        case '*': *(buf+i) = 'm';break;
        case '/': *(buf+i) = 'D';break;
        case '^': *(buf+i) = 'X';break;
        case '&': *(buf+i) = 'A';break;
        case '|': *(buf+i) = 'O';break;
        case '~': *(buf+i) = 'C';break;
        case '!': *(buf+i) = 'N';break;
        case '=': *(buf+i) = 'E';break;
        case '<': *(buf+i) = 'L';break;
        case '>': *(buf+i) = 'G';break;
        case ' ': ++i;
            while (*(name+1) != '\0') (*(buf+i) = *(name+1);
                            ++i;++l;)
            —l,—i;
            break;
        case '[': *(buf+i) = 'i';++l,break;
        case '(': *(buf+i) = 'f';++l,break;
```

TABLE 4-continued

```
            default : dprintf("unknown char in operator %c\b",c);
                break;
            }
        }
        *(buf+i) = '\0';
        new_name = (char *)get_memory(strlen(buf)+8+1);
        sprintf(buf1,"operator_%s",buf);
        np = GenSym_Id(buf1);
        return(np);
}
modify_func_name(func)
SYMDECL *func;
{
    NAME *np:
    if (fnOPER(func))
        SYMDECL_NAME(func) =
            change_operator_fn_name(VARNAME(func));
    else if (fnCONV(func))
        SYMDECL_NAME(func) = change_conv_fn_name(func);
    else SYNDECL_NAME(func) =
            change_fn_name(VARNAME(func));
}
copy_function_args(nfunc,func)
SYMDECL *nfunc, *func;
```

TABLE 5

```
{
    NAME *np;
    SYMDECL *args,*Args,*Args1,*new_arg;
    FUNCREC *funcrec;
    int count;
    char buf[2048];
    buf[0] = '\0';
    args = FUNCTION_ARGS(nfunc);
    for (Args = Args1 = NULL,count = 0; args != NULL; args = SYMDECL_NEXT(args)) {
        springf(buf,"ooArg%d",count++);
        np = GenSym_Id(buf);
        ALLOCATE_SYMDECL(new_arg);
        *new_arg = *args;
        SYMDECL_NAME(new_arg) = np;
        SYMDECL_NEXT(new_arg) = NULL;
        if (Args == NULL) Args = new_arg;
        else SYMDECL_NEXT(Args1) = new_arg;
        Args1 = new_arg;
    }
    ALLOCATE_FUNCREC(funcrec);
    *funcrec = *SYMDECL_FUNCINFO(func);
    SYMDECL_FUNCINFO(nfunc) = funcrec;
    FUNCREC_PROTOARGS(funcrec) = Args;
}
xwrapper_func_code(nfunc,funcall,tag)
SYMDECL *nfunc;
char (funcall;
TAGDECL *tag;
{
    SYMDECL *args;
    int count,d;
    char buf[2048],buf1[2048],*ret;
    char buf2[512];
    buf[0] = '\0';
    args = FUNCTION_ARGS(nfunc);
    for (count = 0; args != NULL; args = SYMDECL_NEXT(args)) {
        if (count++ > 0) strcat(buf,",");
        strcat(buf,VARNAME(args));
    }
    d = NEXT_DTYPE(SYMDECL_DTYPE(nfunc));
    if (FIRST_DTYPE(d) == D_NULL &&
        (SYMDECL_TYPE(nfunc) == D_VOID ||
         SYMDECL_TYPE(nfunc) == D_NO_TYPE))
        ret =" ";
    else ret = "return";
    *buf2 = '\0';
    sprintf(buf1,"{%s%s(%s(%s));}",OODB_TRAP_ON_CODE(buf2,tag),ret,funcall,buf);
    FUNCTION_CODE(nfunc) = string_save(buf1);
}
SYMDECL *xwrap_func(func,tag)
SYMDECL *func;
TAGDECL *tag;
```

TABLE 5-continued

```
{
    SYMDECL *nfunc;
    ALLOCATE_SYMDECL(nfunc);
    *nfunc = *func;
    copy_function_args(nfunc,func);
    modify_func_name(func);
```

TABLE 6

```
/* generate function code for inline member functions */
    if (FUNCTION_DEFINED(func))
        xwrapper_func_code(nfunc,VARNAME(func),tag);
/* existing member func gets changed,
    and its original duplicate nfunc is inserted */
    if (fnCONV(func)) {
        SYMDECL_FNTYPE(func) = 0;
        SYMDECL_CONV_COUNT(nfunc) = SYMDECL_CONV_COUNT(func);
    }
    SYMDECL_VIRTUAL(func) = 0;
    return(nfunc);
}
is_cp_constructor(mem,tag)
SYMDECL *mem;
TAGDECL *tag;
{
    int arity;
    unsigned int dtype;
    SYMDECL *args;
    if (SYMDECL_NAME(mem) != TAGDECL_NAME(tag)) return(0);
    if (FUNCTION_ARITY(mem) != 1) return(0);
    args = FUNCTION_ARGS (mem);
    dtype = SYMDECL_DTYPE(args);
    if (C_ISREF(dtype) && NEXT_DTYPE(dtype) == 0) {
        int type = SYMDECL_TYPE(args);
        TAGDECL *tag1;
        if (type == D_TYPEREF) {
            SYMDECL *typedef_sym = SYMDECL_TYPEDEFNAME(args);
            if CLASS_STRUCT_TYPE(SYMDECL_TYPE(typedef_sym)))
                tag1 = SYMDECL_TAG(typedef_sym);
            else retunr(0);
        }
        else if (CLASS_STRUCT_TYPE(type)) tag1 = SYMDECL_TAG(args);
        else return(0);
        if (tag == tag1) return(1);
        else return(0);
    }
    return(0);
}
create_operator_eq(tag)
TAGDECL *tag;
{
    SYMDECL *fn,*arg;
    char buf[2048],buf1[2048];
    ALLOCATE_SYMDECL(arg);
    SYMDECL_NAME(arg) = GenSym_Id("arg");
    SYMDECL_TYPE(arg) = D_TYPEREF;
    SYMDECL_TYPEDEFNAME(arg) = TAGDECL_TAGTYPEDEF(tag);
    SYMDECL_DTYPE(arg) = D_REF;
    SYMDECL_TYPEQ(arg) = D_CONST;
    ALLOCATE_SYMDECL(fn);
    SYMDECL_NAME(fn) = GenSym_Id(OP_EQ);
    SYMDECL_FNTYPE(fn) = FNTYPE_OPER;
    SYMDECL_TYPE(fn) = D_TYPEREF;
    SYMDECL_TYPEDEFNAME(fn) = TAGDECL_TAGTYPEDEF(tag);
    SYMDECL_ACCESS(fn) = D_PUBLIC;
    make_fnrec(fn,arg,1);
    SYMDECL_DTYPE(fn) = INSERT_DTYPE(D_FTN,D_REF);
    OODB_ARG_TRAP_ON_CODE("arg",TAGNAME(tag),buf1);
```

TABLE 7

```
sprintf(buf,"{\n\
    %s\n\
    {int i;char *ptr = (char *)this,*ptr1 = (char *)&arg;\n\
        for (i = 0; i < sizeof(*this); ++i) *ptr++ = *ptr1++;}\n\
    return(*this);}",
    buf1);
symdecl_INITCODE(fn) = string_save(buf);
xaddend_member(tag,fn);
create_cp_constructor(tag)
TAGDECL *tag;
{
    SYMDECL *fn,*arg;
    char buf[2048],buf1[2048];
    create_default_constructor(tag);
    ALLOCATE_SYMDECL(fn);
    SYMDECL_NAME(fn) = GenSym_Id(TAGNAME(tag));
    SYMDECL_FNTYPE(fn) = FNTYPE_CTOR;
    SYMDECL_TYPE(fn) = D_NO_TYPE;
    SYMDECL_ACCESS(fn) = D_PUBLIC;
    ALLOCATE_SYMDECL(arg);
    SYMDECL_NAME(arg) = GenSym_Id("arg");
    SYMDECL_TYPE(arg) = D_TYPEREF;
    SYMDECL_TYPEDEFNAME(arg) =
    TAGDECL_TAGTYPEDEF(tag);
    SYMDECL_DTYPE(arg) = D_REF;
    SYMDECL_TYPEQ(arg) = D_CONST;
    make_fnrec(fn,arg,1);
    OODB_ARG_TRAP_ON_CODE("arg",TAGNAME(tag),buf1);
    sprintf(buf,"{\n\
        %s\n\
        {int i;char *ptr = (char *)this,*ptr1 = (char *)&arg;\n\
            for (i = 0; i < sizeof(*this); ++i) *ptr++ = *ptr1++;}\n",
        buf1);
#if 0
    sprintf(buf,"\n\
        {%s}",
        buf1);
#endif
```

TABLE 7-continued

```
    SYMDECL_INITCODE(fn) = string_save(buf);
    xaddend_member(tag,fn);
}
xwrapper(tag)
TAGDECL *tag;
{
    SYMDECL *nmem;
    SYMDECL *members = TAGDECL_MEMBERLIST(tag);
    int ty = TAGDECL_TYPE(tag);
    int op_flag,cp_flag;
```

TABLE 8

```
if (oodb_Nwrapped(TAGNAME(tag))) return(0);
if (DO_NOT_WRAP_TAG(ty)) return(0);
Xlast_Member_Added = NULL;
Add_Wrapper_Baseclass(tag);
op_flag = cp_flag = 0;
for (; members != NULL; members = SYMDECL_NEXT(members)) |
    if (IS_MEMBER_FUNCTION(members) && IS_FRIEND(members)) {
        xwrap_friend_member_func(members);
        continue;
    }
    else if (DO_NOT_WRAP(members)) {
        if (SYMDECL_NAME(members) == TAGDECL_NAME(tag) &&
            fnCTOR(members) && is_cp_constructor(members, tag))
            cp_flag = 1;
        continue;
    }
    else if (OPERATOR_EQ(members))
        op_flag = 1;
    nmem = xwrap_func(members,tag);
    SYMDECL_NEXT(nmem) = SYMDECL_NEXT(members);
    SYMDECL_NEXT(members) = nmem;
    members = nmem;
    }
    if (!op_flag) create_operator_eq(tag);
    if (!cp_flag) create_cp_constructor(tag);
}
xwrap_friend_member_func(func)
SYMDECL *func;
{
    TAGDECL *tag = ENV(func); /* get class of func */
    SYMDECL *member;
    member = find_member(func,tag);
    if (member == NULL) dprintf("error: xwrap_member_func");
    if (IS_WRAPPABLE(member)) modify_func_name(func);
```

TABLE 8-continued

```
}
/*called for out-of-class member function definitions */
SYMDECL *xwrapper_change_functioon_name(func)
SYMDECL *func;
{
    SYMDECL *member;
    if (!IS_MEMBER_FUNCTION (func)) return(NULL);
    if (DO_NOT_WRAP(func)) return(MULL);
/* find real member - and check whether its name needs to be changed */
    member = find_member(func,SYMDECL_ENV(func));
    if (member == NULL) {
        dprintf("error:member not found: xwrapper_change_function_name");
        return(NULL);
    }
    if (DO_NOT_WRAP(member)) return(NULL);
    SYMDECL_FNTYPE(func) = SYMDECL_FNTYPE(member);
    SYMDECL_CONV_COUNT(func) = SYMDECL_CONV_COUNT(member);
    modify_func_name(func);
    if (fnCONV(func))
        SYMDECL_FNTYPE(func) = 0;
return(member); /* code for generated member if done in
```

TABLE 9

```
xwrapper_function_code */

}
xwrapper function_code (mem_func, func)
SYMDECL T_mem_func* func;
SYMDECL *nfunc;
if {!mem_func} return(0);
LOCATE_SYMDECL(nfunc);
nfunc = *func;
SYMDECL_NAME(nfunc) = SYMDECL_NAME(mem_func);
SYMDECL_FNTYPE(nfunc) = SYMDECL_FNTYPE(mem_func);
copy_function_args(nfunc,func);
xwrapper_func_code(nfunc,VARNAME(func),SYMDECL_ENV(func));
print_symbol(nfunc);
/* can free up nfunc */
}
SYMDECL *find_member(func,tag)
SYMDECL *func;
TAGDECL *tag;
{
SYMDECL *memlist = TAGDECL_MEMBERLIST(tag);
NAME *np;
np = SYMDECL_NAME(func);
for (; memlist != NULL; memlist = SYMDECL_NEXT(memlist)) {
    if (SYMDECL_NAME(memlist) == np && ISFTN(memlist) &&
      same_func_signature(func,memlist))
        return(memlist);
}
return(NULL);
cm_Wrapper_Baseclass()
NAME *np;
TAGDECL *tag;
extern SYMDECL *make_class_typedef();
np = GenSym_Id(WRAPPER_BASECLASS_NAME);
Wrapper_Baseclass_Namep = np;
ALLOCATE_TAGDECL(tag);
TAGDECL_NAME(tag) = np;
TAGDECL_TYPE(tag) = D_CLASS_TAG;
TAGDECL_TAGTYPEDEF(tag) = make_class_typedef(tag);
NAME_TAGINFO(np) = tag;
}
Add_Wrapper_Baseclass(tag)
TAGDECL *tag;
{
BASECLASS *base;
ALLOCATE_BASECLASS(base);
if (Wrapper_Baseclass_Namep == NULL) Form_Wrapper_Baseclass();
BASECLASS_NAME(base) = Wrapper_Baseclass_Namep;
BASECLASS_ACCESS(base) = D_PUBLIC;
BASECLASS_VIRTUAL(base) = 1;
```

TABLE 10

```
BASECLASS_NEXT(base) = TAGDECL_BASELIST(tag);
TAGDECL_BASELIST(tag) = base;
}
OODB_TRAP_ON_CODE(buf,tag)
char *buf;
TAGDECL *tag;
{
char buf1(256);
print_tagname(tag,buf1);
sprintf(buf,"if(%s == 1) (\n\
  int sz;char *classname;void (*fn1) (void *),(*fn2) (void *,int);\n\
  %s->%s(((%s *)this)->%s(sz,classname,fn1,fn2));%s(0);}*,
  WRAPPER_TRAP_FLAG_OODB_INSTANCE,TRAP_ON,
  buf1,GET_REAL_OBJ,
  WRAPPER_SET_TRAP);
}
OODB_ARG_TRAP_ON_CODE(name,type,buf)
char *name,*type,*buf;
{
sprintf(buf,"if(%s,%s == 1) (\n\
  int sz;char *classname;void (*fn1) (void *),(*fn2) (void *,int);\n\
  %s->%s(((%s &)%s),%s(sz,classname,fn1,fn2));\n\
  ((%s &)%s),%s(0);}*,
  name,WRAPPER_TRAP_FLAG,OODB_INSTANCE,TRAP,ON,
  type,name,GET_REAL_OBJ,type,name,WRAPPER_SET_TRAP);
}
```

We claim:

1. A computer implemented method for event detection to detect an event and notification, comprising the steps of:
    searching a programming language including a function for a section of said function;
    inserting a sentry in said function so as to set a trap for said event detection:
    compiling said programming language to form executable code;
    executing said executable code and said trap to detect said event.

2. The computer implemented method for event detection and notification as in claim 1, wherein the method step of searching a program language comprises the step of parsing the program language as C++.

3. A computer implemented method for event detection and notification as in claim 2, wherein the step of inserting a sentry in said function comprises the step of extending the programming language, wherein said programming language has object-oriented capabilities.

4. The computer implemented method for an event detection and notification as in claim 3, wherein the step of extending the program language comprises the step of extending the object-oriented capabilities having at least one of encapsulation, methods or inheritance.

5. A computer implemented method for event detection and notification as in claim 1, wherein the method comprises the step of providing to the sentry additional behavior extensions.

6. A computer implemented method for event detection and notification as in claim 5, wherein the behavior extensions consist of versioning, persistence, replication management, security access, encryption, decryption, maintaining indexes, object type access, distribution, performance monitoring and maintaining dependency nets.

7. The computer implemented method for an event detection and notification as in claim 1, wherein the step of searching for the programming language comprises the step of preprocessing with a programming language preprocessor.

8. The computer implemented method for event detection and notification as in claim 1, wherein the step of preprocessing said programming language comprises the step of compiling the programming language by a compiler to form said executable code.

9. A computer implemented method for event detection and notification as in claim 1, wherein said step of inserting a sentry comprises the step of utilizing a class of constructs corresponding to said sentry, and designating said class of constructs by one of a compiler flag or preprocessor flag, said one of said compiler flag or said preprocessing flag listing classes to be sentried or to be unsentried.

10. A computer implemented method for event detection and notification as in claim 1, wherein the step of searching for a programming language comprises the step of searching for a C++ language annotation associated with the programming language.

11. A computer implemented method for event detection and notification service as in claim 1, wherein the method further comprises the step of said sentry detecting operations to class instances.

12. A computer implemented method for event detection and notification as in claim 1, wherein the method comprises the step of removing behavior extensions existing at run time.

13. A computer implemented method for event detection and notification as in claim 1, wherein the function includes a public state, the method further comprises the step of allocating a storage area to accommodate an instance of a class prior to potential use of the public state.

14. A computer implemented method for event detection and notification as claim 1, wherein the method comprises the step of adding a delegation mechanism to said programming language.

15. A computer implemented method for event detection and notification as in claim 1, wherein the method comprises the step of adding a before function to said programming language.

16. A computer implemented method for event detection and notification as in claim 1, wherein the method comprises the step of adding an after function to said programming language.

17. A computer implemented method for event detection and notification as in claim 1, wherein the method comprises the step of adding an around function to said programming language.

18. A computer apparatus for event detection to detect an event and notification, comprising:
means for searching a programming language including a function for a section of said function;
means for inserting a sentry in said function so as to set a trap for said event detection;
means for compiling said programming language to form executable code; and
means for executing said executable code and said trap to detect said event.

19. A computer apparatus for event detection and notification as in claim 18, wherein the means for searching the program language comprises means for extending the programming language, wherein said programming language has object-oriented capabilities.

20. A computer apparatus for an event detection and notification as in claim 19, wherein means for extending the program language comprises means for extending the object-oriented capabilities having at least one of encapsulation, methods or inheritance.

21. A computer apparatus for event detection and notification as in claim 18, wherein the apparatus comprises means for providing to the sentry additional behavior extensions.

22. A computer apparatus for event detection and notification as in claim 21, wherein the additional behavior extensions consist of versioning, persistence, replication management, security access, encryption, decryption, maintaining indexes, object type access, distribution, performance monitoring and maintaining dependency nets.

23. A computer apparatus for event detection and notification as in claim 18, wherein the means for searching comprises means for parsing the program language as C++.

24. A computer apparatus for an event detection and notification as in claim 18, wherein said means for searching for the programming language comprises a programming language preprocessor.

25. A computer apparatus for event detection and notification as in claim 18, wherein the step of preprocessing said programming language comprises a compiler for compiling the programming language by a compiler to form said executable code.

26. A computer apparatus for event detection and notification as in claim 18, wherein said means for inserting a sentry comprises means for utilizing a class of constructs corresponding to said sentry, and designating said class of constructs by one of a compiler flag or preprocessor flag, said one of said compiler flag or said preprocessing flag listing classes to be sentried or to be unsentried.

27. A computer apparatus for event detection and notification as in claim 18, wherein said means for searching for a programming language comprises means for searching for a C++ language annotation associated with the programming language.

28. A computer apparatus for event detection and notification service as in claim 18, wherein the apparatus further comprises means for said sentry detecting operations to class instances.

29. A computer apparatus for event detection and notification as in claim 18, wherein the apparatus further comprises means for removing behavior extensions existing at run time.

30. A computer apparatus for event detection and notification as in claim 18, wherein the function includes a public state, the apparatus further comprises means for allocating a storage area to accommodate an instance of a class prior to potential use of the public state.

31. A computer apparatus for event detection and notification as in claim 18, wherein the apparatus further comprises means for delegation in said programming language.

32. A computer apparatus for event detection and notification as in claim 18, wherein the apparatus further comprises means for adding a before function to said programming language.

33. A computer apparatus for event detection and notification as in claim 18, wherein the apparatus further comprises the means for adding an after function to said programming language.

34. A computer apparatus for event detection and notification as in claim 18, wherein the apparatus further comprises means for adding an around function to said programming language.

* * * * *